(No Model.)

J. RIFE.
COMBINED PLOW AND HARROW.

No. 590,671. Patented Sept. 28, 1897.

WITNESSES
W. A. Schonborn.
W. M. Mason.

INVENTOR
James Rife
by John Wedderburn
Attorney

UNITED STATES PATENT OFFICE.

JAMES RIFE, OF SHELLSBURG, IOWA.

COMBINED PLOW AND HARROW.

SPECIFICATION forming part of Letters Patent No. 590,671, dated September 28, 1897.

Application filed August 7, 1896. Serial No. 602,058. (No model.)

*To all whom it may concern:*

Be it known that I, JAMES RIFE, a citizen of the United States, residing at Shellsburg, in the county of Benton and State of Iowa, have invented certain new and useful Improvements in a Combined Plow and Harrow; and I do hereby declare the following to be a full, clear, and exact description of the invention, such as will enable others skilled in the art to which it appertains to make and use the same.

I find that it is advantageous to immediately harrow land after it has been plowed, no matter what its condition may be. By allowing the plowed ground to remain in that condition for some time it becomes dry and after harrowing is not as good as it would be if immediately harrowed after plowing.

My object is to provide a harrow attachment for plows, so that the ground will be harrowed in a highly superior manner immediately after it has been plowed, thereby lessening the labor about one-half, as both operations are carried on simultaneously.

Having this object in view, my invention consists of a novel form of harrow attachment for plows, comprising certain improved features and combinations appearing more fully hereinafter in the appended claims and in the accompanying drawings, in which—

Figure 1:
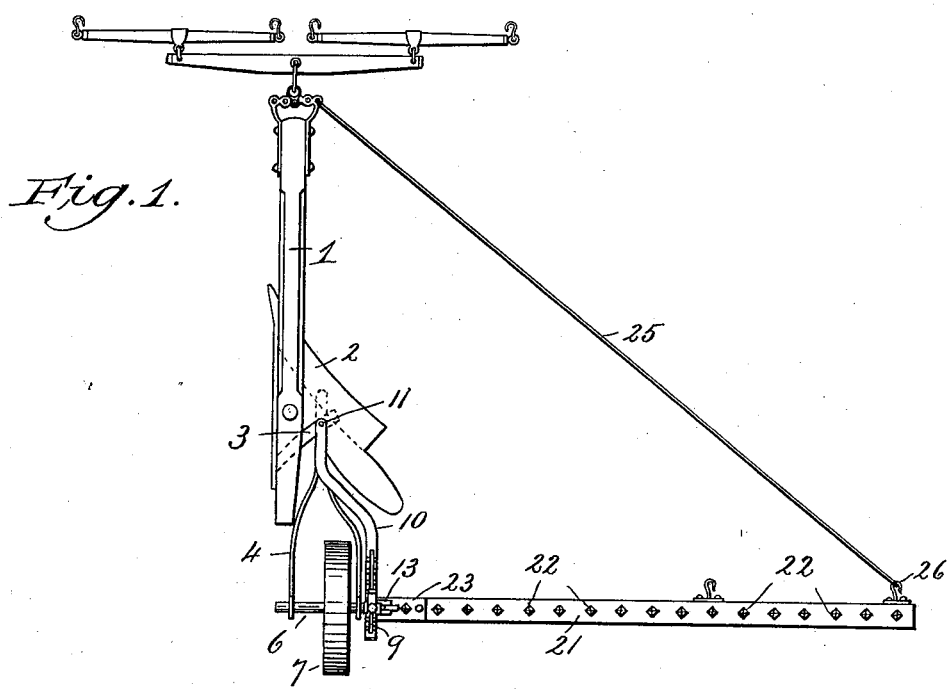
Figure 2:
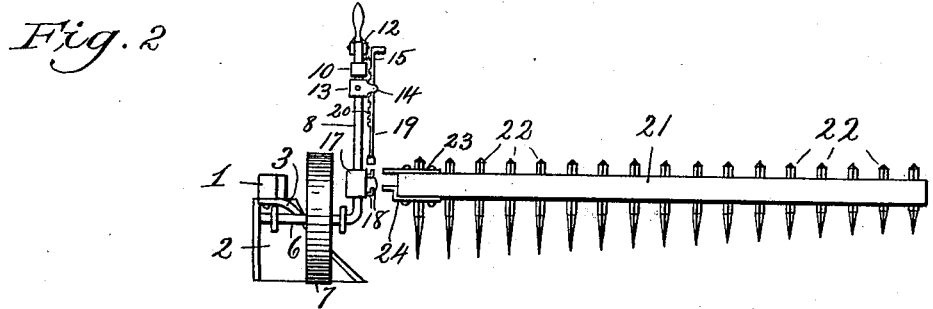
Figure 3:
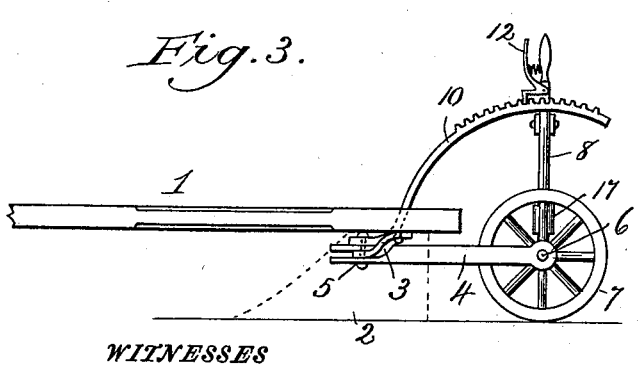
Figure 4:
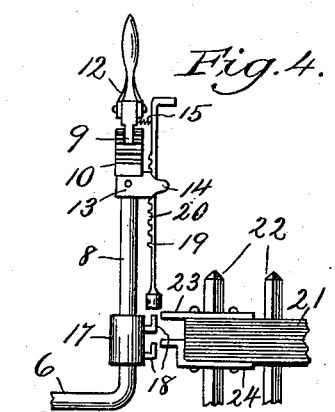

Figure 1 is a plan view; Fig. 2, a side elevation; Fig. 3, an end view, and Fig. 4 a detail view showing the mechanism for locking the controlling-lever and pull-bar.

The numeral 1 designates the plow-beam, and 2 the plow. I have shown the ordinary style of whiffletree and clevis, and as these are of common construction they will not be described.

The numeral 3 designates the brace which extends from the portable plow-beam. At 4 is shown a frame comprising two converging arms which are connected to the brace 3 by any joint 5, preferably a ring connected to the frame 4 and a clevis fastened to the brace, which will allow vertical and lateral movement of the frame.

The numeral 6 designates a spindle which extends across the arm of the frame, being journaled therein, and on this spindle there is loosely mounted a wheel 7, which is adapted to run in the furrow. This spindle is extended upwardly to form a controlling-lever 8, which passes through a slot 9 in a rack 10, which is extended downwardly and connects to the frame 4 at 11.

The numeral 12 designates a spring-pressed handle which is pivoted to the lever and normally adapted for engagement with the teeth of the rack, being of ordinary construction.

At 13 is shown a bracket which is connected to the controlling-lever, being provided with an eye 14.

The numeral 17 designates a sleeve which is slidable vertically on the controlling-lever, being provided with two upwardly-turned pintles 18.

At 19 is shown a pull-bar which is provided with a series of notches 20, said bar having its lower end made tubular and slipped over the upper pintle, being keyed thereto, and it slides through the eye 14, a coil-spring 15 normally pressing it in engagement with the bracket.

At 21 is shown the beam of the harrow. The harrow teeth or spikes are of ordinary construction, being of the pointed variety, but square in cross-section, and are shown at 22. The spikes or teeth are shortest at the free end of the beam and become slightly longer in regular succession toward the pivoted end of the beam.

The numerals 23 and 24 designate metal straps which have eyes and are adapted for reception on the pintles 18, so that the harrow-beam can be swung around laterally, as found desirable.

The numeral 25 designates a brace-rod which is connected at one end to the clevis of the plow-beam and at the other end to a hook 26, which is fastened to the free end of the harrow-beam.

When it is desired to give either a forward or backward "rake" or inclination to the harrow teeth or spikes, the controlling-lever is moved along the rack and allowed to again engage therewith at the desired point. The harrow-beam will then be held in the right position. When it is desirable to lift the harrow-beam, this is accomplished by retracting the locking-bolt and drawing the pull-bar upwardly and again allowing the locking-bolt to come in engagement with the latter. The harrow-beam is rendered readily detachable from the plow by virtue of the hinges employed. Owing to the disposition of the wheel, the frame in which the former is journaled, and the manner in which the frame is connected to the brace the wheel will follow along in the furrow and properly guide the plow and harrow-beam, the latter rising and falling simultaneously with the rise and fall of the wheel.

By resorting to slight changes in the construction of my improved attachment it can be connected to any form of plow, either walking or riding, and, furthermore, many other immaterial changes of construction might be resorted to in carrying out my invention, and hence it is to be understood that I do not limit myself to the precise construction herein shown and described, but consider that I am entitled to all such variations as come within the spirit and scope of the invention.

Having thus described my invention, what I claim as new, and desire to secure by Letters Patent, is—

1. The combination with a plow, of a frame hinged thereto, a wheel journaled in said frame and adapted to travel in the furrow, a controlling-lever, a rack with which the controlling-lever engages, a sleeve slidable on said lever, means for raising and lowering said lever and a harrow-beam provided with teeth and connected to the sleeve.

2. The combination with a plow, of a frame hinged thereto, a wheel journaled in the frame, a rack connected to the frame, a controlling-lever adapted to engage with said rack, a sleeve slidable on the controlling-lever, a bracket connected to the controlling-lever, a harrow-beam provided with teeth and connected to the sleeve, a pull-rod connected to the beam and slidable through the bracket, and locking mechanism for said pull-rod.

3. The combination with a plow, of a frame hinged thereto, a wheel journaled in the frame, a rack connected to the frame and provided with a slot, a controlling-lever movable in the slot and provided with mechanism adapted for engagement with the rack, a bracket connected to the lever and provided with an eye, a spring-pressed locking-bolt slidable in said bracket, a sleeve slidable on the lever and provided with pintles, a pull-bar having a series of recesses slidable in the eye, said recesses being adapted for engagement with the locking-bolt, a harrow-beam provided with teeth, said harrow-beam being hinged on the pintle of the sleeve, and a brace connecting the free end of the harrow-beam with the plow.

In testimony whereof I have signed this specification in the presence of two subscribing witnesses.

JAMES RIFE.

Witnesses:
A. K. RIFE,
M. M. GARRETSON.